(12) United States Patent
Nakai et al.

(10) Patent No.: US 9,428,820 B2
(45) Date of Patent: Aug. 30, 2016

(54) METHOD FOR PRODUCING COBALT SULFATE

(71) Applicant: Sumitomo Metal Mining Co., Ltd., Tokyo (JP)

(72) Inventors: Takayuki Nakai, Niihama (JP); Noriyuki Nagase, Niihama (JP); Shin-ichi Heguri, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 14/368,123

(22) PCT Filed: Dec. 6, 2012

(86) PCT No.: PCT/JP2012/081631
§ 371 (c)(1),
(2) Date: Jun. 23, 2014

(87) PCT Pub. No.: WO2013/099551
PCT Pub. Date: Jul. 4, 2013

(65) Prior Publication Data
US 2014/0348731 A1    Nov. 27, 2014

(30) Foreign Application Priority Data

Dec. 26, 2011    (JP) ................. 2011-282633

(51) Int. Cl.
*C22B 3/00*     (2006.01)
*C22B 3/32*     (2006.01)
*C01G 51/00*    (2006.01)

(52) U.S. Cl.
CPC ......... *C22B 23/0484* (2013.01); *C01G 51/003* (2013.01); *C22B 3/0022* (2013.01); *C22B 23/04* (2013.01); *C01P 2006/80* (2013.01)

(58) Field of Classification Search
None
See application file for complete search history.

(56) References Cited

U.S. PATENT DOCUMENTS

2003/0033906 A1* 2/2003 Kerfoot et al. ................. 75/743
2010/0031779 A1   2/2010 Abe et al.

FOREIGN PATENT DOCUMENTS

| CN | 101532094 |   | 9/2009 |
| JP | 50-87990  |   | 7/1975 |
| JP | 57140839 A | * | 8/1982 |
| JP | 60-231420 |   | 11/1985 |

(Continued)

OTHER PUBLICATIONS

Cyanex Brochure (Dec. 2008).*

(Continued)

*Primary Examiner* — Melissa Swain
(74) *Attorney, Agent, or Firm* — Gerald E. Hespos; Michael J. Porco; Matthew T. Hespos

(57) ABSTRACT

Provided is a method for producing cobalt sulfate, wherein, on the occasion of separating an acidic solution containing calcium, magnesium and sodium as impurities from a cobalt chloride solution by solvent extraction, when a diluent is added to the extractant to be used to dilute the extractant by 10% to 30% by volume; in Step 1, the operational pH is maintained in the range of 4.0 to 5.0 and the liquid volume ratio of organic phase/liquid phase is maintained in the range of 5.0 to 7.0; in Step 2, the operational pH is maintained in the range of 4.0 to 4.5 and the liquid volume ratio of organic phase/liquid phase is maintained in the range of 5.0 to 10.0; and in Step 3, the pH is maintained in the range of 0.5 to 1.0.

5 Claims, 1 Drawing Sheet

(56) References Cited

FOREIGN PATENT DOCUMENTS

| JP | 63-50411 | 10/1988 |
|----|----------|---------|
| JP | 1-60538 | 12/1989 |
| JP | 2011-195920 | 10/2011 |
| JP | 2012-153546 | 8/2012 |

OTHER PUBLICATIONS

Luo, Lin, et al., Extraction studies of cobalt (II) and nickel (II) from chloride solution using PC88A, Trans. Nonferrous Met. Soc. China 16, (Aug. 2006).*

International Search Report dated Mar. 12, 2013.

* cited by examiner

METHOD FOR PRODUCING COBALT SULFATE

BACKGROUND OF THE INVENTION

1. Technical Field

The present invention can be utilized in a field in which it is intended to obtain high purity cobalt sulfate that has a reduced amount of impurities, particularly calcium, magnesium and sodium, and can be used in battery materials, from an acidic hydrochloric acid solution containing cobalt.

2. Background Art

Cobalt is often included in mineral ores in co-presence with nickel, and is obtained as a co-product in nickel refining.

There are various methods for smelting this nickel or cobalt; however, in pyrometallurgical method in which mineral ores are introduced into a furnace together with a reducing agent, since cobalt is not separated from nickel and is directly smelted into ferronickel that serves as a raw material for stainless steel, cobalt loss occurs, which is not preferable.

Thus, a refining method has been conventionally used, in which method sulfur is added to mineral ores and introduced the mineral ores into a furnace to perform sulfurizing roasting, sulfide of nickel and cobalt thus obtained is leached in sulfuric acid, and the leachate thus obtained is subjected to a method such as solvent extraction, and thereby collecting cobalt as metal or a salt. However, this method of combining sulfurizing roasting and acid leaching has a problem of increases in effort and cost accompanied by an increase in the quantity of material required for the treatment, in connection with the downgrading of raw material ores that comes along with a drain on resources of the recent years.

Particularly, when leaching is performed using sulfuric acid, there has been a problem that the scale of facilities is expanded because time is required for leaching, and unless sulfuric acid generated after metal is collected is discharged out of the system, the sulfuric acid balance of the process cannot be maintained, while it is necessary to supply sulfur needed for the sulfurizing roasting described above.

Thus, recently, a method of leaching low-grade nickel ores with a sulfuric acid solution at a high temperature and a high pressure, separating impurities, subsequently adding a sulfurizing agent thereto to obtain a sulfide, leaching this sulfide with a chloride, and obtaining cobalt metal therefrom, has been put to practical use.

When this method is used, there is an advantage that since leaching of sulfide with a chloride proceeds rapidly, the facilities are relatively compact and satisfactory. In addition to that, the sulfur obtainable as leaching residue after the leaching of a sulfide with a chloride can be recycled as a raw material of the sulfurizing agent, and since electro winning by means of a chloride bath has higher conductivity than a sulfuric acid bath, the electric power for electrolysis can be saved. Also, the chloride ions obtained after collecting cobalt metal can be recycled to the leaching process. Thus, it is known be advantageous in view of being efficient, cost-saving, and effort-saving.

However, when the method is used, metal can be collected efficiently; however, it is not easy to obtain salts of cobalt, particularly cobalt sulfate.

Particularly, in recent years, cobalt sulfate has been used in large quantities as a material for secondary batteries, but there are requirement specifications of cobalt sulfate for exclusive use in batteries for the purpose of securing battery characteristics or securing safety. Among others, it is necessary to maintain the amount of chloride ions in the cobalt sulfate crystals generally at a level of 0.1% or less.

In regard to such harsh specifications, for example, a method of purifying cobalt metal once, and dissolving this purification product in sulfuric acid to obtain cobalt sulfate may be conceived, but when the time and cost required for production are considered, the method is not economically efficient. As such, it has been not so easy to obtain cobalt sulfate from a chloride.

Thus, a method of subjecting a chloride solution containing cobalt to solvent extraction to extract cobalt ions, subjecting these cobalt ions to be stripped with a sulfuric acid solution, and thereby obtaining a cobalt sulfate solution, can be conceived.

As an extractant capable of separating the cobalt, extractants such as phosphonic acid and phosphinic acid are known. Among specific examples of the phosphonic acid and phosphinic acid, 2-ethylhexylphosphonic acid mono-2-ethylhexyl ester and di(2,4,4-trimethylpentyl)phosphinic acid have been generally used since these compounds have satisfactory cobalt extractability.

When an extractant such as phosphonic acid or phosphinic acid is used, the extraction behavior is dependent on the pH of the solution, and there is a tendency that as the pH increases, the extraction rate increases. Furthermore, it has been contemplated that cobalt and other impurity elements can be extracted into an organic solvent by utilizing the characteristic that the pH dependency appropriate for extraction varies with the element.

Japanese Examined Patent Publication No. 63-50411 describes a method of collecting nickel and cobalt from nickel and cobalt alloy scrap, characterized in that an alloy scrap which contains nickel and cobalt but does not contain other elements in the form of compound, is electrolytically dissolved using an aqueous sulfuric acid solution as an electrolyte liquid while maintaining the negative electrode current density at 2 A/dm2 or less, the aqueous solution containing nickel sulfate and cobalt sulfate thus obtained is subjected to a solution purification treatment, nickel ions and cobalt ions are extracted into an organic substance from the purified aqueous solution, nickel and cobalt ions are stripped from the extract liquid using hydrochloric acid or sulfuric acid, and thereby a mixed aqueous solution of nickel chloride and cobalt chloride or a mixed aqueous solution of nickel sulfate and cobalt sulfate is obtained.

When this method is used, an aqueous solution of cobalt of a chloride bath or a sulfuric acid bath can be obtained from cobalt of a sulfuric acid bath.

However, in the chloride solution containing cobalt, impurities such as calcium, magnesium and sodium are also co-present. The extraction behavior of these impurities in the extractants described above has a property similar to the extraction behavior of cobalt, so that it has been difficult to remove impurities such as calcium, magnesium and sodium from a solution containing cobalt.

In regard to the method of separating impurities, Japanese Unexamined Patent Application Publication No. 2010-43313 discloses a method of promoting an enhancement in the copper extraction ability when copper is solvent extracted from a chloride bath.

This method is a method of collecting copper by solvent extraction from an acidic aqueous solution containing copper chloride and chlorides of alkali metals and/or alkaline earth metals, using a cation exchange type extractant, and solvent extraction is carried out in the presence of sulfate ions. A sulfuric acid compound selected from the group consisting of sodium sulfate, magnesium sulfate, calcium sulfate, potassium sulfate and ammonium sulfate is added to the acidic aqueous solution, and the content of sulfate ions is adjusted to the range of 10 g/L to 100 g/L.

Furthermore, the chlorine ion concentration and the bromine ion concentration in the acidic aqueous solution can be adjusted to predetermined ranges, and an acidic chelate extractant can be used as a cation exchange type extractant. In addition, it is disclosed that the copper extraction ability is increased, and the amount of solution handled in the copper leaching process carried out in the previous step can be reduced, so that the facility cost, operation cost and the like can be reduced.

However, a method of easily separating impurities such as calcium, magnesium and sodium in an industrially effective manner from a solution mainly containing cobalt, has not yet been found.

An object of the present invention is to produce high purity cobalt sulfate by effectively eliminating impurities such as calcium, magnesium and sodium in a process for obtaining a cobalt sulfate solution having a high cobalt concentration by solvent extraction using an acidic organic extractant.

SUMMARY OF THE INVENTION

A first aspect of the present invention for solving such problems is a method for producing cobalt sulfate, by which cobalt sulfate is produced from a chloride solution containing cobalt, the method including subjecting a chloride solution containing cobalt to a solvent extraction process composed of the following Step 1 to Step 3, and thereby producing cobalt sulfate:

(1) Step 1 of bringing an extracting solvent containing an extractant at a proportion of 10% to 30% by volume into contact with a chloride solution containing cobalt at a pH in the range of 4.0 to 5.0, thereby extracting cobalt from the chloride solution containing cobalt, and forming a cobalt-retaining organic phase;

(2) Step 2 of mixing the cobalt-retaining organic phase obtained in the Step 1 with a cleaning liquid containing cobalt to cause impurities included in the cobalt-retaining organic phase to transfer into the cleaning liquid containing cobalt, and thereby forming a cobalt-retaining organic phase after cleaning; and (3) Step 3 of adding dilute sulfuric acid as a stripped starting liquid to the cobalt-retaining organic phase after cleaning in the Step 2 so as to obtain a pH in the range of 0.5 to 1.0, thereby bringing the cobalt-retaining organic phase after cleaning into contact with dilute sulfuric acid, and thus producing a cobalt sulfate solution.

A second aspect of the present invention is a method for producing cobalt sulfate according to the first aspect, characterized in that the extractant is an acidic phosphoric acid ester-based extractant.

A third aspect of the present invention is a method for producing cobalt sulfate according to the first and second aspects, characterized in that in the Step 1, the liquid volume ratio (O/A0) of the cobalt-retaining organic phase (O) to the chloride solution containing cobalt (A0) is maintained within the range of 5.0 to 7.0.

A fourth aspect of the present invention is a method for producing cobalt sulfate according to the first to third aspects, characterized in that in the Step 2, the liquid volume ratio (O/A1) of the cobalt-retaining organic phase (O) to the cleaning liquid containing cobalt (A1) is maintained within the range of 5 to 10, and also, the pH is maintained within the range of 4.0 to 4.5 to thereby transfer the impurity ions included in the cobalt-retaining organic phase to the cleaning liquid containing cobalt.

A fifth aspect of the present invention is a method for producing cobalt sulfate according to the first to fourth aspects, characterized in that the amount of sulfuric acid contained in the stripped starting liquid that is added to the cobalt-retaining organic phase is adjusted so that the cobalt concentration in the cobalt sulfate solution obtainable by the Step 3 is maintained within the range of 60 g/L to 100 g/L.

A sixth aspect of the present invention is a method for producing cobalt sulfate according to the first to fifth aspects, characterized in that the impurities include any one or more of calcium ion, magnesium ion, and sodium ion.

A seventh aspect of the present invention is a method for producing cobalt sulfate according to the first to sixth aspects, characterized in that the chloride solution containing cobalt is a solution obtained by separating, through solvent extraction, a chloride solution containing nickel and cobalt that is obtained by leaching a sulfide containing nickel with a chloride and chlorine gas.

According to the present invention, industrially noticeable effects are provided as below:

(1) high purity cobalt sulfate with lower concentrations of calcium, magnesium and sodium can be produced; and (2) cobalt sulfate with a low chloride level is obtained with using a highly efficient smelting method utilizing a chloride bath.

DESCRIPTION OF EMBODIMENTS

Figure 1:
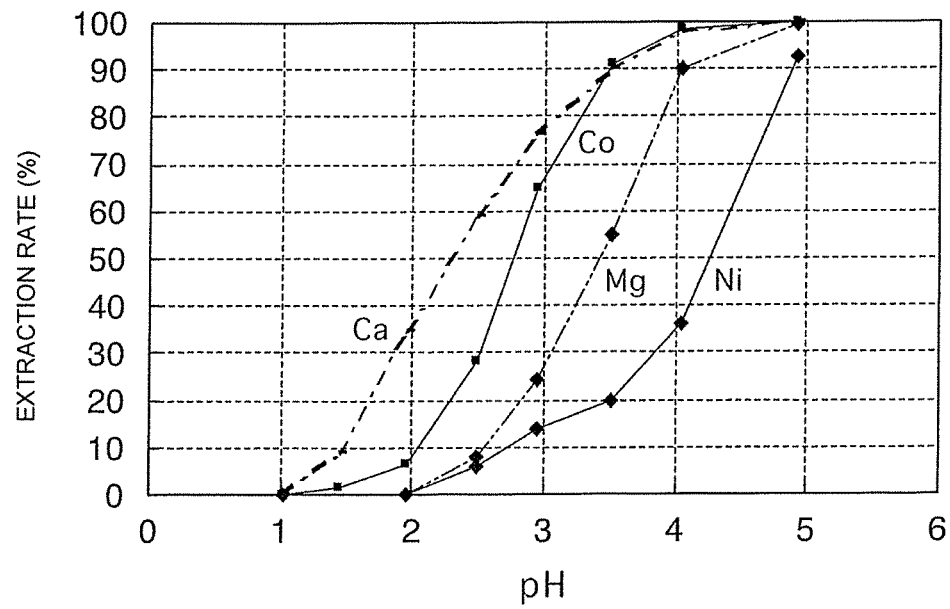
FIG. 1 is a diagram illustrating the relationship of the extraction pH of Step 1 (extraction step) to the extraction rates for various elements.

The present invention relates to the production of high purity cobalt sulfate from a chloride solution containing cobalt, and the invention is particularly suitable for a chloride solution containing cobalt that is obtained by separating, through solvent extraction, a chloride solution containing nickel and cobalt obtainable by leaching a sulfide containing nickel with a chloride and chlorine gas.

To this end, in the present invention, on the occasion of separating an acidic solution containing calcium, magnesium and sodium as impurities from a cobalt chloride solution by solvent extraction, when a diluent is added to the extractant to be used to dilute the extractant to a concentration of 10% to 30% by volume, and preferably 15% to 25% by volume; in Step 1, the operational pH is maintained in the range of 4.0 to 5.0, preferably in the range of 4.3 to 4.7, and the volume ratio of the liquid represented by organic phase/liquid phase is maintained in the range of 5.0 to 7.0; in Step 2, the operational pH is maintained at 4.0 to 4.5 and the volume ratio of the liquid represented by organic phase/liquid phase is maintained at 5.0 to 10.0; and in Step 3, the pH is maintained in the range of 0.5 to 1.0, the concentration ratios of calcium, magnesium and sodium with respect to the cobalt concentration in the cobalt sulfate solution thus obtainable are reduced to 0.0001, 0.0001, and 0.00005 or less, respectively.

The solvent extraction process of the present invention is specifically composed of the following three steps.

[Step 1 (Extraction Step)]

Step 1 is an extraction step in which an extracting solvent that has been diluted to contain an extractant at a concentration of 10% to 30% by volume, and desirably 15% to 25% by volume, is brought into contact with a chloride solution containing impurities such as cobalt, calcium, magnesium and sodium at a pH in the range of 4.0 to 5.0, and thus cobalt is extracted to obtain a cobalt-retaining organic phase. Meanwhile, the pH is maintained in the predetermined range by adjusting the pH through addition while the pH is measured even during extraction.

If the level of the extractant is less than 10% by volume, since the amount of the organic solvent needed relative to the same amount of extraction starting liquid is increased, scale-up of the facilities is required. At a level of more than 30% by volume, the viscosity of the organic solvent after dilution is high, defects in organic/aqueous phase separation are prone to occur, and stable operation is made difficult.

[Step 2 (Cleaning Step)]

Step 2 is a cleaning step in which the cobalt-retaining organic phase obtained in the Step 1 is mixed with a cleaning liquid in which cobalt has been incorporated in advance, and the calcium ion, magnesium ion and sodium ion included in the cobalt-retaining organic phase are transferred into the cleaning liquid containing cobalt and then separated from cobalt.

[Step 3 (Stripping Step)]

Step 3 is a stripping step of bringing the cobalt-retaining organic phase after cleaning in the Step 2 into contact with dilute sulfuric acid, which is a stripped starting liquid, at a pH maintained in the range of 0.5 to 1.0, and thus obtaining a cobalt sulfate solution.

A factor important throughout the above-described three steps is how cobalt and various impurity elements, particularly calcium, magnesium and sodium, can be separated from a chloride solution containing cobalt. Thus, the influence exerted by the process conditions (pH, and the composition ratio of the organic phase (O) and the liquid phase (A)) during the process on the extraction of impurities from a cobalt chloride solution, was clarified.

FIG. 1 illustrates the relationship between the extraction pH and the extraction rates for various elements.

According to FIG. 1, it is necessary that the pH be 4.0 or higher in order to secure the extraction efficiency for cobalt. However, since the extraction rates for impurity elements such as magnesium also increase, it is desirable to adjust the pH to the range of 4.3 to 4.7 in consideration of the extraction of cobalt and the separability of impurities.

Furthermore, in the case of returning cobalt from the organic solvent into the aqueous solution in the stripping process of the Step 3, it is desirable to adjust the pH to an acidic range of 1.0 or less, and more preferably to a range of 0.5 to 0.8.

Figure 2:
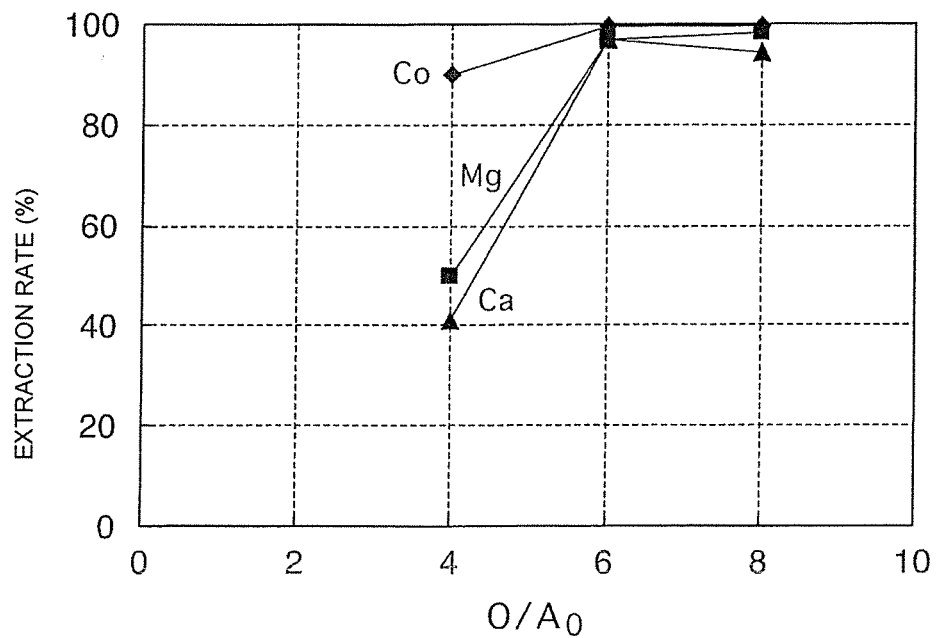
FIG. 2 is a diagram illustrating the relationship of the liquid volume ratio (O/A0) of the organic solvent (O) to the aqueous solution (A0) in Step 1 (extraction step), to the extraction rates for cobalt, magnesium and calcium.

FIG. 2 illustrates the relationship of the liquid volume ratio (O/A0) of the organic solvent (O) to the aqueous solution (A0) of the Step 1 (extraction step), to the extraction rates for cobalt, magnesium and calcium.

According to FIG. 2, the extraction rates for the various components increase along with an increase in the liquid volume ratio, and when the liquid volume ratio is 4.0, the extraction rate for cobalt reaches about 90%.

In the Step 1 (extraction step), the liquid volume ratio of the organic solvent (O) to the aqueous solution (A0) is required to be 5.0 or higher, and in order to avoid scale-up of facilities, it is desirable that the liquid volume ratio between the organic solvent (O) and the aqueous solution (A0) be smaller. Thus, the optimal liquid volume ratio may be in the range of 5.0 to 7.0. Meanwhile, the aqueous solution (A0) in the Step 1 (extraction step) is a chloride solution containing cobalt (A0).

Table 1 shows the relationship of the liquid volume ratio (O/A1) of the organic solvent (O) to the cleaning liquid containing cobalt (A1) in the Step 2 (cleaning step), to the cleaning efficiencies (unit: %) for magnesium, calcium and sodium. When the liquid volume ratio (O/A1) is decreased, the cleaning efficiency for calcium is increased; however, the proportion of the amount of the cleaning liquid to the amount of the stripped liquid is increased, and there is a problem in view of productivity.

Thus, it can be seen that in order to obtain a cleaning efficiency for calcium of higher than 95%, the liquid volume ratio (O/A1) is desirably in the range of 5 to 10.

TABLE 1

| $O/A_1$ | Mg | Ca | Na |
|---|---|---|---|
| 1 | 98.9 | 98.8 | >90 |
| 2 | 98.7 | 97.4 | >90 |
| 5 | 98.2 | 98.3 | >90 |
| 10 | 98.2 | 96.7 | >90 |
| 15 | 98.2 | 95.0 | >90 |

Table 2 shows the relationship of the pH of the Step 2 (cleaning step) to the calcium concentration in the organic solvent after the cleaning step. When the pH is 3.5 or less, calcium can be cleaned, but the cobalt concentration in the organic solvent is also decreased. At the pH 4.6 or higher, the cleaning ability for calcium is decreased. Thus, the pH of the cleaning process is desirably in the range of 4.0 to 4.5.

TABLE 2

| | cleaning pH | Organic phase [g/L] | |
|---|---|---|---|
| | | Co | Ca |
| Extracting organic | — | 11.8 | 0.003 |
| cleaning organic | 3.44 | 8.5 | 0.001 |
| | 3.90 | 10.3 | <0.001 |
| | 4.23 | 11.5 | <0.001 |
| | 4.65 | 13.4 | 0.002 |
| | 5.04 | 15.1 | 0.001 |

The cobalt concentration in the cobalt sulfate solution thus produced is preferably maintained in the range of 60 g/L to 100 g/L. Because when the cobalt concentration is lower, this causes a decrease in production efficiency, while when the cobalt concentration is higher, crystallization is likely to occur. Keeping the cobalt concentration of the cobalt sulfate solution in a predetermined range is achieved by adjusting the amount of sulfuric acid contained in the stripped starting liquid that is added to the cobalt-retaining organic phase. For example, when dilute sulfuric acid is used as the stripped starting liquid to be added, the keeping is achieved by adjusting the concentration of the dilute sulfuric acid.

Hereinafter, the present invention will be explained using Examples.

EXAMPLES

A two-stage mixer-settler (3 L FRP MIXER SETTLER manufactured by NIHON FRP Co., Ltd.) was used in Step 1 (extraction step) for solvent extraction, a three-stage mixer-settler was used in Step 2 (cleaning step), and a two-stage mixer-settler was used in Step 3 (stripping step).

The mixer-settlers used were models having an effective capacity of the mixer unit in the mixer settler of 0.5 liters, and an effective capacity of the settler unit of 3 liters.

The Step 1 (extraction step) and the Step 3 (stripping step) were carried out such that the organic solvent and the aqueous solution were in a countercurrent flow.

The Step 2 (cleaning step) was carried out such that the organic solvent entered through the first stage mixer and exited through the third stage settler, while, as to the aqueous solution, a cobalt sulfate solution was used as a cleaning liquid containing cobalt in order to increase the cleaning efficiency for impurities in the organic solvent, and was injected into the mixer of each stage of the cleaning step and discharged through the settler exit of each stage.

Regarding the organic phase used, an extractant having a functional group formed from 2-ethylhexyl phosphonic acid mono-2-ethylhexyl ester (trade name: PC88A, manufactured by Daihachi Chemical Industry Co., Ltd.) was used, and a dilution obtained by diluting the extractant with an alkyl benzene-based diluent (trade name: TECLEAN N20, manufactured by Nippon Oil Corp.) by 10% to 30% by volume, was used.

The supply amount of the mixed organic solvent was set to 112 ml/min; the supply amount of the cobalt chloride solution of the Step 1 was set to 22 ml/min; the supply amount of the cobalt sulfate solution of the Step 2 was set to 10.5 ml/min, but was set to 3.5 ml/min in each stage for supplying liquid to each stage of the mixers; and the flow rate of dilute sulfuric acid of the Step 3 was set to 15 ml/min.

Example 1

A cobalt sulfate solution was produced using the cobalt chloride solution (starting solution) indicated in Table 3 as the starting liquid supplied for solvent extraction, and using the solvent extraction conditions indicated in Table 4. The results are presented together in Table 3.

The chloride ion concentration in the cobalt sulfate solution obtained by the present invention was less than 0.1 g/L, and from the abundance ratio with cobalt, the chloride level in the cobalt sulfate crystals was suppressed to 0.02% or less.

Comparative Example 1

A cobalt sulfate solution (end liquid) was produced in the same manner as in Example 1, using the cobalt chloride solution indicated in Table 3 and using the solvent extraction conditions of Table 4. The results are presented together in Table 3.

In Comparative Example 1, it was found that since the pH value at the time of contact between the extracting solvent of the Step 1 and the chloride solution containing cobalt was lower than the range of the present invention, extraction of cobalt increased slightly; however, since impurities such as calcium and magnesium became easily extractable in a simple manner, the impurity concentration in the stripped liquid increased.

Comparative Example 2

Cobalt sulfate was produced in the same manner as in Example 1, except that the solvent extraction conditions indicated in Table 4 were conditions that were not in the scope of the present invention. The results are presented together in Table 3.

In this Comparative Example 2, since the concentration of the extractant was as high as more than 30 Vol. %, the upper limit of the cobalt concentration in the organic solvent increased; however, since impurities were also simply extracted into the organic solvent, the quality of the cobalt sulfate solution thus obtainable deteriorated. Meanwhile, in contrast to Comparative Example 2, when the concentration of the extractant was too low, the cobalt concentration in the cobalt sulfate solution thus obtainable decreased while the impurity concentration also decreased. Therefore, although the ratio of impurities to cobalt did not change much, since the cobalt concentration was low, a decrease in productivity could not be avoided.

TABLE 3

|  | Co [g/L] | Ca [g/L] | Mg [g/L] | Na [g/L] |
|---|---|---|---|---|
| Cobalt chloride solution (starting liquid) | 64 | 0.041 | 0.069 | 1.6 |
| Example 1 Cobalt sulfate solution | 72 | 0.006 | 0.004 | 0.003 |
| Comparative Example 1 | 86 | 0.045 | 0.020 | 0.021 |
| Comparative Example 2 (end liquid) | 99 | 0.03 | 0.016 | 0.006 |

TABLE 4

|  | Level of extractant [Vol %] | Step 1 | | Step 2 | | Step 3 |
|---|---|---|---|---|---|---|
|  |  | pH | $O/A_0$ | pH | $O/A_1$ | pH |
| Example 1 | 12.4 | 4.6 | 5.2 | 4-4.5 | 10 | 0.6 |
| Comparative Example 1 | 16 | 3.5 | 5.0 | 4-4.5 | 10 | 0.6 |
| Comparative Example 2 | 30.2 | 4.6 | 5.0 | 4-4.5 | 10 | 0.6 |

In regard to the Example, it was found that in the cobalt chloride solution as a starting liquid, the concentration ratios of calcium, magnesium and sodium with respect to cobalt were 0.0006, 0.001 and 0.025, respectively, whereas in the cobalt sulfate produced by treating through the solvent extraction process composed of three steps of the Step 1 (extraction step), the Step 2 (cleaning step), and the Step 3 (stripped step) of the present invention, the concentration ratios of calcium, magnesium and sodium with respect to the cobalt concentration were reduced to 0.0001, 0.0001, and 0.00005 or less, respectively.

On the contrary, in the Comparative Examples in which the solvent extraction conditions were not within the scope of the present invention, all the impurity element concentration ratios with respect to the cobalt concentration did not decrease sufficiently as compared with Example, and high purity cobalt sulfate could not be produced.

The invention claimed is:
1. A method for producing cobalt sulfate from a chloride solution containing cobalt,
the method comprising:
Step 1: contacting an organic phase with an aqueous solution, the organic phase including an extracting solvent and an extractant at a proportion of 10% to 30% by volume, the aqueous solution is the chloride solution containing cobalt at a pH of 4.0 to 5.0, the aqueous solution further containing calcium, magnesium, and sodium, maintaining a liquid volume ratio ($O/A_0$) of the organic phase to the aqueous solution in a range of 5 to 7, extracting cobalt from the aqueous solution into the organic phase, and thereby forming a cobalt-retaining organic phase, maintaining the pH of the aqueous solution in a range of 4.0 to 5.0 while extracting the cobalt into the organic phase, and obtaining the cobalt-retaining organic phase;

Step 2: mixing the cobalt-retaining organic phase with a cleaning liquid in a liquid volume ratio of the cobalt-retaining organic phase to the cleaning liquid ($O/A_1$) in the range of 5 to 10, the cleaning liquid containing an aqueous cobalt solution, removing impurities from the cobalt-retaining organic phase and transferring the impurities into the cleaning liquid, forming a cobalt-retaining organic phase after cleaning, maintaining a pH within a range of 4.0 to 4.5, and obtaining a cobalt-retaining organic phase after cleaning; and Step 3: adding a stripped starting liquid to the cobalt-retaining organic phase after cleaning, the stripped starting liquid includes sulfuric acid and has a pH of 0.5 to 1.0, maintaining a pH of a mixture of the stripped starting liquid and the cobalt-retaining organic phase after cleaning of 0.5 to 1.0 extracting cobalt from the cobalt-retaining organic phase after cleaning into the stripped starting liquid thereby forming a cobalt sulfate solution, wherein the ratio of the concentration of calcium, magnesium, and sodium to the concentration of cobalt in the cobalt sulfate solution are, respectfully, 0.0001, 0.0001, and 0.00005 or less.

2. The method for producing cobalt sulfate according to claim 1, wherein the extractant is an acidic phosphoric acid ester.

3. The method for producing cobalt sulfate according to claim 1, wherein the amount of sulfuric acid contained in the stripped starting liquid to be added to the cobalt-retaining organic phase is adjusted such that the cobalt concentration in the cobalt sulfate solution obtained in the Step 3 is maintained within the range of 60 g/L to 100 g/L.

4. The method for producing cobalt sulfate according to claim 1, wherein the impurities include at least one of calcium ion, magnesium ion, and sodium ion.

5. The method for producing cobalt sulfate according to claim 1, wherein the chloride solution containing cobalt is a solution obtained by separating, through solvent extraction, a chloride solution containing nickel and cobalt that is obtained by leaching a sulfide containing nickel with a chloride and chlorine gas.

* * * * *